(12) United States Patent
Lewis et al.

(10) Patent No.: US 6,697,223 B2
(45) Date of Patent: Feb. 24, 2004

(54) DISC HEAD SLIDER WITH POLE TIP SPACING DE-COUPLED FROM SLIDER FLY HEIGHT

(75) Inventors: Derek A. Lewis, San Jose, CA (US); Anthony P. Sannino, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 113 days.

(21) Appl. No.: 10/016,245

(22) Filed: Dec. 10, 2001

(65) Prior Publication Data

US 2002/0071215 A1 Jun. 13, 2002

Related U.S. Application Data

(60) Provisional application No. 60/254,685, filed on Dec. 11, 2000.

(51) Int. Cl.[7] .................................................. G11B 5/60
(52) U.S. Cl. ................................. 360/235.7; 360/236.5
(58) Field of Search ........................... 360/235.7, 236.3, 360/236.5, 237, 236.1, 236.8, 294.1

(56) References Cited

U.S. PATENT DOCUMENTS

| | | | | |
|---|---|---|---|---|
| 5,490,025 A | * | 2/1996 | Dorius et al. ............ | 360/236.4 |
| 5,751,517 A | * | 5/1998 | Agarwal ................... | 360/235.4 |
| 5,940,249 A | | 8/1999 | Hendriks .................... | 360/103 |
| 6,040,965 A | * | 3/2000 | Terunuma et al. .......... | 360/122 |
| 6,144,528 A | * | 11/2000 | Anaya-Dufresne et al. ...................... | 360/235.4 |
| 6,233,118 B1 | * | 5/2001 | Boutaghou et al. ....... | 360/235.4 |
| 6,424,494 B1 | * | 7/2002 | Koishi ..................... | 360/235.6 |
| 6,498,701 B1 | * | 12/2002 | Berg ........................ | 360/235.4 |
| 6,560,071 B2 | * | 5/2003 | Chapin et al. ........... | 360/235.7 |

FOREIGN PATENT DOCUMENTS

JP    2000-207860    * 7/2000

* cited by examiner

*Primary Examiner*—Brian E. Miller
(74) *Attorney, Agent, or Firm*—Westman, Champlin & Kelly (57) ABSTRACT

A disc head slider has a disc facing surface with a leading slider edge and a trailing slider edge. A primary bearing feature is formed on the disc facing surface forward of the trailing slider edge and has a bearing surface. A plurality of pads is formed on the disc facing surface between the primary bearing feature and the trailing slider edge. Each of the pads has an upper surface that is discrete from the upper surfaces of the other pads. An airflow barrier wall is positioned adjacent the plurality of pads to at least partially shield the plurality of pads from airflow from the primary bearing feature.

26 Claims, 10 Drawing Sheets

DISC HEAD SLIDER WITH POLE TIP SPACING DE-COUPLED FROM SLIDER FLY HEIGHT

CROSS-REFERENCE TO RELATED APPLICATION

This application claims priority from U.S. Provisional Application No. 60/254,685 filed on Dec. 11, 2000 for inventors Derek A. Lewis and Anthony P. Sannino and entitled "Air Bearing De-Coupling Pole Tip Spacing From Slider Fly Height".

Cross reference is also made to U.S. Ser. No. 09/472,262, entitled "Shear-Based Transducer for HDD Read/Write Element Height Control," filed on Dec. 27, 1999.

FIELD OF THE INVENTION

The present invention relates to disc drive data storage systems and, more particularly, to a disc head slider for communicating with a recording medium within a disc drive.

BACKGROUND OF THE INVENTION

Disc drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g., air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a compliant connection that allows the slider to pitch and roll and assume an orientation relative to the disc that balances the hydrodynamic forces that support the slider.

The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and fly above or in close proximity to the disc surface.

One type of slider is a "self-loading" air bearing slider, which includes a leading taper (or stepped-taper), a pair of raised rail features, a cavity dam and a subambient pressure cavity. The leading taper is typically lapped or etched onto the end of the slider that is opposite to the recording head. The leading taper pressurizes the air as the air is dragged under the slider by the disc surface. The trailing edge of the cavity dam provides an expansion path for the air to de-pressurize as it is dragged into the sub-ambient pressure cavity by the disc velocity. The expanded air in the cavity provides a self-loading force which forces the slider toward the disc surface. The counteraction between positive pressure developed along the rail features, the preload force provided by the suspension and the self-loading force provides the air bearing with a high vertical stiffness.

The physical separation between the slider and the disc surface at the recording head is an important parameter to disc drive performance. It is desired to minimize variation in the head clearance or "flying height" as the date storage device is operated. As recording density increases, recording heads must fly closer to the disc surface to maintain signal strength. Lower flying heights necessitate tighter tolerances on fly height variation to avoid head-disc interactions. Currently, target fly heights are achieved in part by precisely controlling the dimensions of the slider during the manufacturing process. In the future however, manufacturing limits may be reached, and methods for correcting slider fly characteristics after fabrication may be needed. Furthermore, reductions in the required fly height may require some form of active adjustment to maintain the spacing between the head and disc.

Various techniques have been proposed for changing slider geometry or orientation or for moving a portion of the slider in response to the head clearance during operation to control fly height. These techniques have limits in actuation frequency response due to the dynamic characteristics of the system since the recording head to disc spacing is coupled to the orientation of the slider and suspension. Furthermore, techniques that use an actuator located on the suspension or the slider must contend with the dynamics of any intervening components in order to change the pole tip spacing, thereby limiting overall performance.

A disc head slider is therefore desired which improves performance of mechanisms for actuating the pole tip spacing independently of the rest of the slider. Embodiments of the present invention provide solutions to these and other problems, and offer other advantages over the prior art.

SUMMARY OF THE INVENTION

One embodiment of the present invention is directed to a disc head slider having a disc-facing surface with a leading slider edge and a trailing slider edge. A primary bearing feature is formed on the disc-facing surface forward of the trailing slider edge and has a bearing surface. A plurality of pads is formed on the disc-facing surface between the primary bearing feature and the trailing slider edge. Each of the pads has an upper surface that is discrete from the upper surfaces of the other pads. An airflow barrier wall is positioned adjacent the plurality of pads to at least partially shield the plurality of pads from airflow from the primary bearing feature.

Another embodiment of the present invention is directed to a disc head slider having a slider body with a disc-facing surface and a trailing surface. A primary bearing feature is formed on the disc-facing surface and has a bearing surface. A piezoelectric microactuator is formed on the trailing surface of the slider body, which is changeable in shape in a direction normal to the disc-facing surface in response to an applied voltage. The microactuator has an upper surface which is recessed from the bearing surface. At least one raised pad is formed on the upper surface of the microactuator. Further features are provided for limiting pressurization of the at least one pad due to airflow from the primary bearing feature.

Other features and benefits that characterize embodiments of the present invention will be apparent upon reading the following detailed description and review of the associated drawings.

DETAILED DESCRIPTION OF ILLUSTRATIVE EMBODIMENTS

Figure 1:
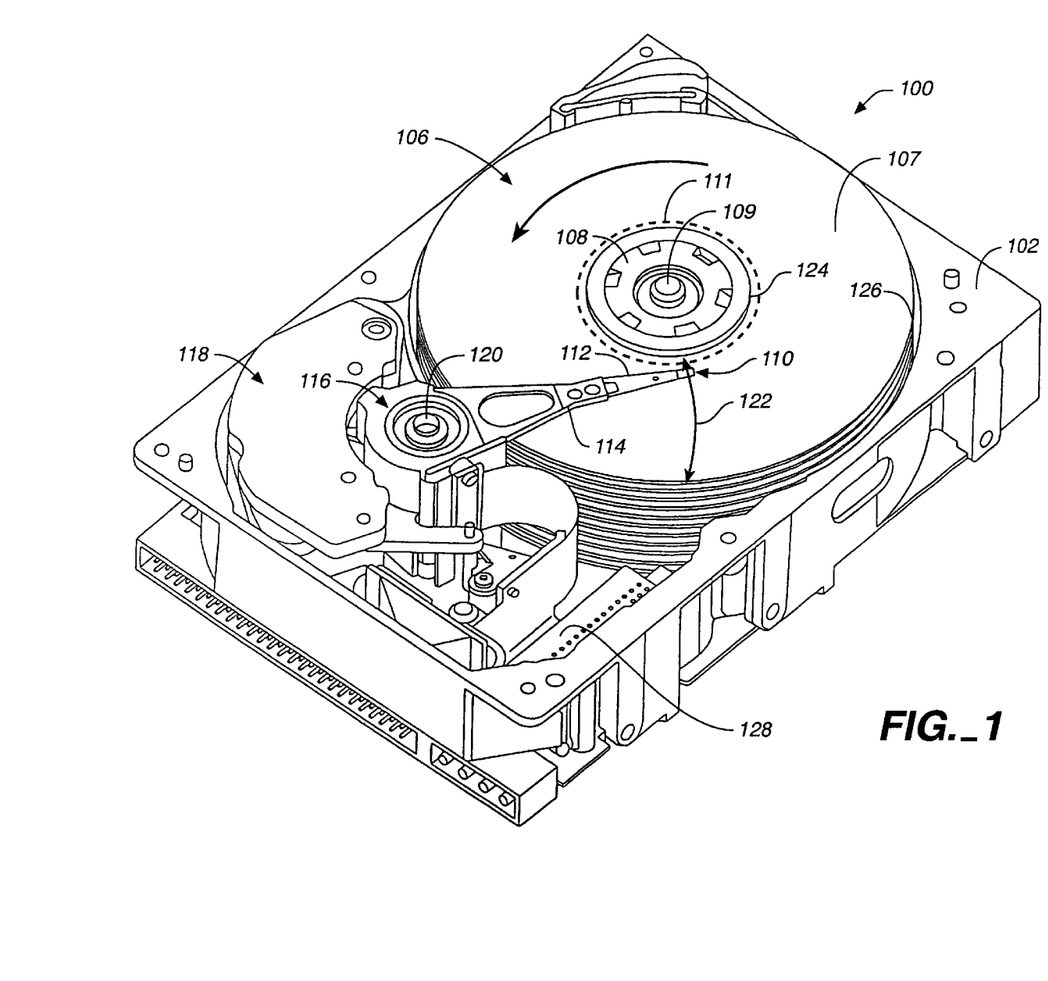
FIG. 1 is a perspective view of a disc drive in which the present invention is useful.

FIG. 1 is a perspective view of a disc drive 100 in which the present invention is useful. Disc drive 100 can be configured as a traditional magnetic disc drive, a magneto-optical disc drive or an optical disc drive, for example. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated slider 110 which is mounted to disc drive 100 and carries a read/write head for communication with the disc surface.

In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor 118 operates under control of internal circuitry 128. Other types of actuators can also be used, such as linear actuators.

During operation, as discs 107 rotate, the discs drag air under the respective sliders 110 and along their bearing surfaces in a direction approximately parallel to the tangential velocity of the discs. As the air passes beneath the bearing surfaces, air compression along the air flow path causes the air pressure between the discs and the bearing surfaces to increase, which creates a hydrodynamic lifting force that counteracts the load force provided by suspensions 112 and causes the sliders 110 to lift and fly above or in close proximity to the disc surfaces.

As discussed in more detail below, slider 110 allows actuation of the read/write head independently of the rest of the slider with minimal impact on the nominal flying characteristics of the air bearing. Actuation of the read/write head is decoupled from the nominal flying characteristics by minimizing pressurization of the features on the slider that are actuated. This minimizes changes in the overall pressurization profile due to actuation, and the corresponding impact on slider attitude.

Figure 2:
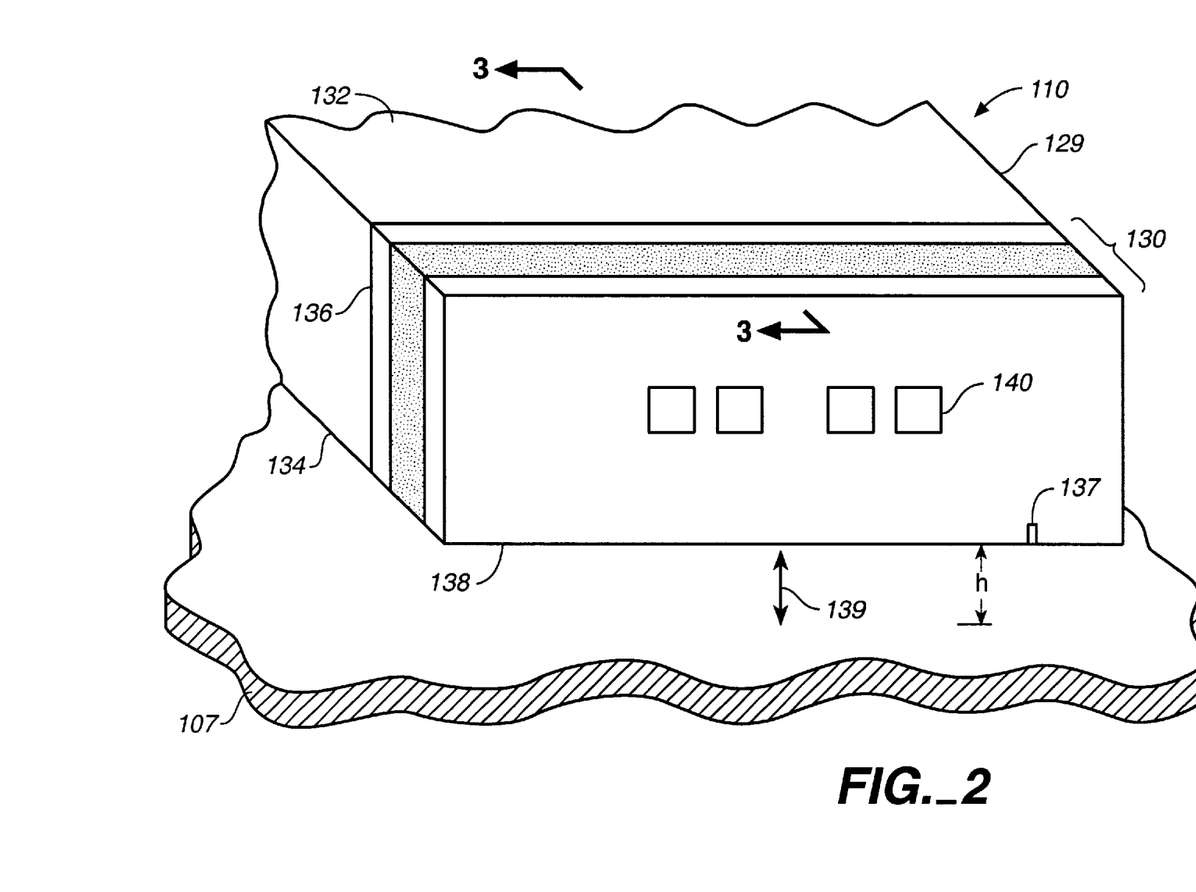
FIG. 2 is a greatly enlarged, simplified perspective view of a portion of a slider positioned over a disc in the disc drive shown in FIG. 1.

FIG. 2 is a greatly enlarged, simplified perspective view of a portion of a slider 110 positioned over one of the discs 107. Slider 110 has a main slider body 129 and a trailing edge shear piezoelectric microactuator structure 130. The main slider body 129 has a back surface 132, a disc-facing surface 134 and a trailing surface 136. Microactuator structure 130 is attached to trailing surface 136. As disc 107 rotates relative to slider 110, in a direction from a leading surface of slider 110 toward trailing surface 136, air compression between slider 110 and disc 107 causes slider 110 to lift and fly at a small distance above the surface of the disc. In the case of a read/write slider, a read/write head 137 is carried by microactuator 130 along a trailing slider edge 138 of slider 110 for reading data from disc 107 and writing data to disc 107. Distance "h" represents the pole tip fly height of head 137 along trailing edge 138. Bond pads 140 provide areas for electrical leads to be attached to slider 110 to allow electrical signals to pass to and from head 137.

Microactuator 130 allows the portion of slider 110 that carries the head 137 along trailing slider edge 138 to be adjusted so that it more closely follows the surface of disc 107 as the disc rotates relative to the slider. Microactuator structure 130 has a free end along trailing slider edge 138, which moves parallel to trailing surface 136 in a direction normal to the surface of disc 107, as indicated by arrow 139 in response to a voltage applied across the active components of the microactuator. By varying the applied voltage, head 137 can be moved closer to or further away from the surface of disc 107.

Figure 3:
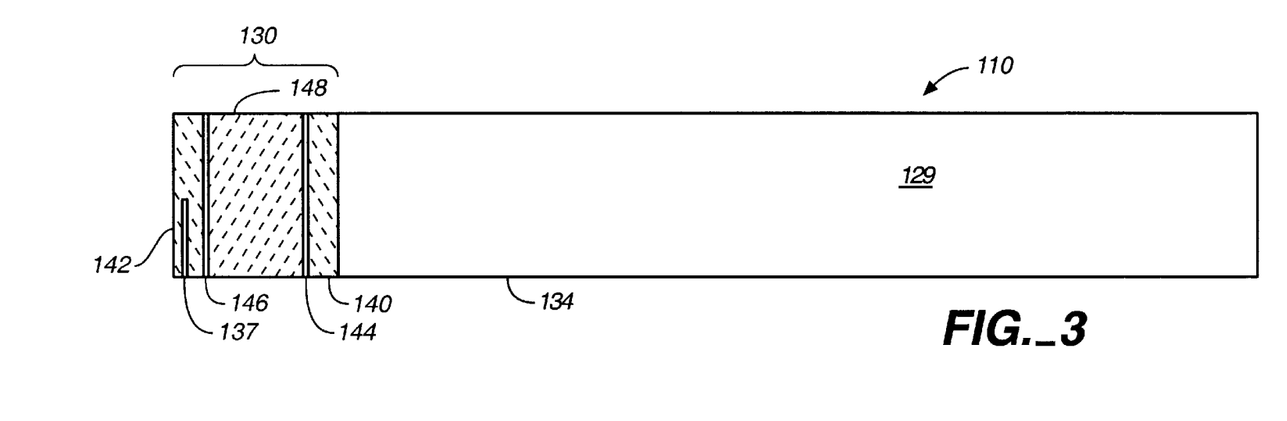
FIG. 3 is a cross-sectional view of the slider taken along lines 3—3 in FIG. 2.

FIG. 3 is a cross-sectional view of slider 110, taken along lines 3—3 in FIG. 2. Microactuator 130 includes a first insulator layer 140, a second insulator layer 142, conductive layers 144 and 146, and piezoelectric layer 148. Slider body 129 is typically formed of a suitable material, such as aluminum titanium carbonate, silicon, or silicon carbonate. Insulating layers 140 and 142 can be formed of alumina, for example. Insulating layers 140 and 142 have two functions. The first is to act as an insulator and the second is to provide a suitable surface to which conductive layers 144 and 146 can be bonded. Insulating layer 140 provides insulation so that when charge is applied to conductive layers 144 and 146, the charge is not transferred to the body 129 of slider 110. Insulator layer 142 prevents charge from passing to head 137, which could interfere with the operation of the head and potentially damage it. Further, insulating layers 140 and 142 prevent voltage discharge between slider 110 and the disc, which can damage the disc.

Conductive layers 144 and 146 can be a thin layer of metal deposited on the alumina and attached to piezoelectric layer 148 with a conductive epoxy. Suitable metals for metal layers 144 and 146 include gold, platinum and nickel, which exhibit low corrosion and are easy to deposit. Suitable conductive epoxies are those which are qualified to work in a disc drive environment. In addition to using a conductive epoxy, it is also possible to attach conductive layers 144 and 146 to the alumina layers 140 and 142 using a fusion bonding method or by depositing a thin layer of metal on the alumina or organically deposited on silicates and related materials. Conductive epoxies alone, without a metallic layer, may also be used.

Piezoelectric layer 148 can include a lead zirconate titanate (PZT), barium zirconate titanate, or other suitable piezoelectric materials, such as ceramics, single crystals or polymers, which exhibit the desired piezoelectric properties. The importance of piezoelectric layer 148 is that once a voltage is applied across the layer, between conductive layers 144 and 146, layer 148 will shear or distort in shape. As piezoelectric layer 148 is sheared, head 137 which is carried at the free end of the microactuator is moved in the direction of the shear, parallel to the flat surfaces of the layer. Thus, by applying a voltage across piezoelectric layer 148, it is possible to move head 131 closer to or further away from the disc surface on command.

It has been found that actuation of the trailing edge of a slider that supports the recording head can interact with the flying characteristics of the slider. As the slider features on which the recording head is mounted move closer to the disc surface or further from the disc surface, the air pressure between these features and the disc surface changes. This can cause substantial changes in the overall flying attitude of the slider and interfere with operation of the recording head. In order to limit interaction between movement of head 137 and the overall pressure profile developed along disc-facing surface 134, disc-facing surface 134 is provided with a surface geometry that limits pressurization of the features under microactuator 130.

Figure 4:
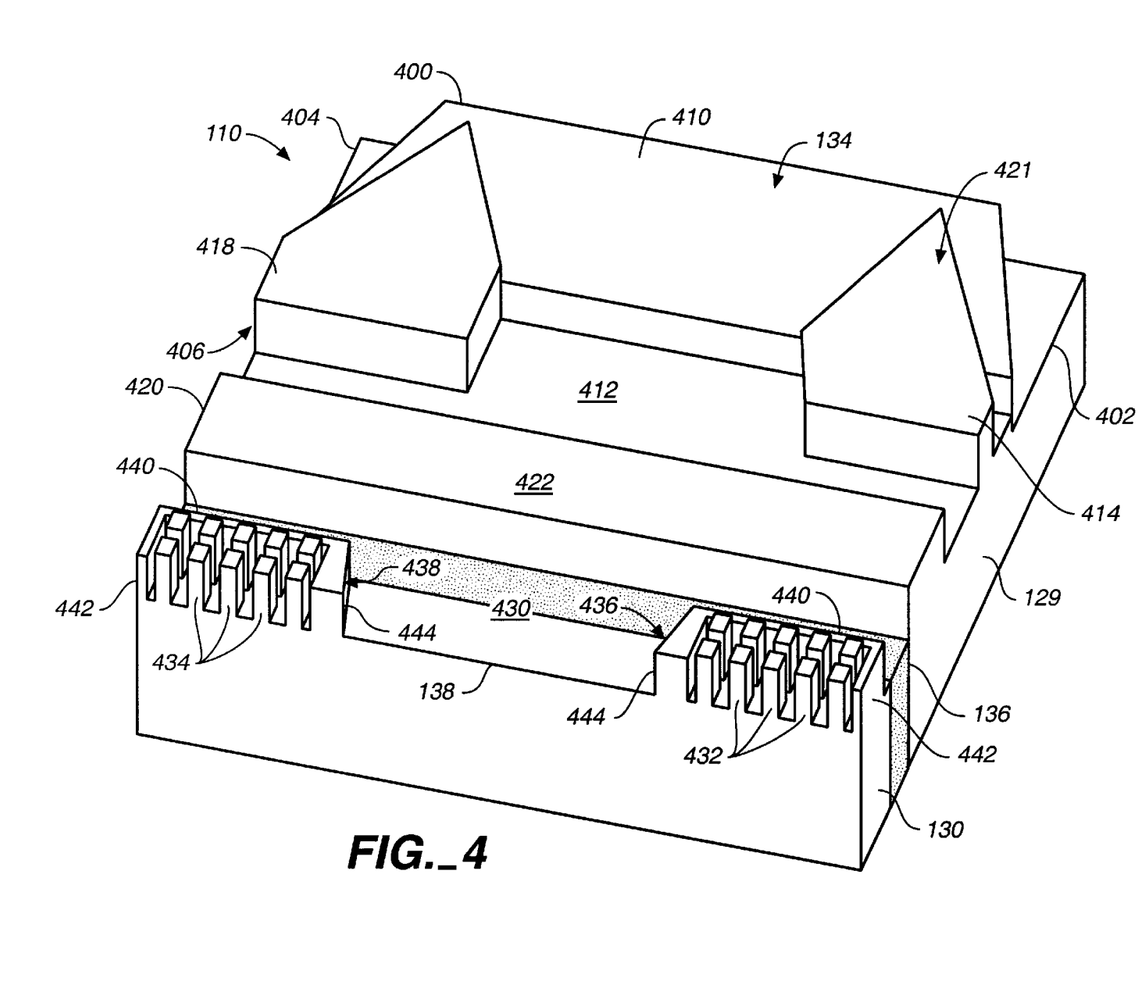
FIG. 4 is a perspective view of the slider as viewed from disc-facing surface according to one embodiment of the present invention.

FIG. 4 is a perspective view of slider 110, as viewed from disc-facing surface 134 according to one embodiment of the present invention. The dimensions of slider 110 are greatly enlarged in the vertical direction for clarity. Disc-facing surface 134 includes a leading edge 400, trailing edge 138 and opposing side edges 402 and 404. A primary bearing feature 406 is formed on disc-facing surface 134, forward of trailing slider edge 138. Primary bearing surface 406 includes a cavity dam 410, a subambient pressure cavity 412, raised side rails 414 and 418 and a raised trailing edge bar 420.

Subambient pressure cavity 412 trails cavity dam 410 relative to the direction of disc rotation. Raised side rails 414 and 418 extend rearward from cavity dam 410 on opposing sides of subambient pressure cavity 412 and have upper surfaces that together form part of an overall bearing surface 421 of slider 110. In one embodiment, cavity dam 410 is parallel to bearing surface 421 and is recessed from bearing surface 421 by a "step depth" of about 0.1 micrometers (um) to 0.3 um, for example. Alternatively, cavity dam 410 can be formed as a leading taper or an otherwise profiled surface. Subambient pressure cavity 412 is recessed from bearing surface 421 by a "cavity depth" of 1 um to 3 um, for example. Other depths can also be used. Rails 414 and 418 can have any suitable shape, length or width in alternative embodiments. Positive air pressure developed along rails 414 and 418 provides slider 110 with lift, pitch and roll stiffness to maintain slider dynamic stability. Subambient pressure developed within cavity 412 counter-acts the positive pressure developed along rails 414 and 418 to further increase the stiffness of slider 110 and to minimize fly height variation with variations in disc speed and altitude.

Raised bar 420 is spaced rearward of rails 414 and 418 and forward of microactuator structure 130. Bar 420 extends laterally along trailing edge 136 of slider body 129, from side edge 402 to side edge 404. In one embodiment, bar 420 has an upper surface 422 that is generally coplanar with the upper surfaces of rails 414 and 418 to thereby form a further portion of bearing surface 421. In an alternative embodiment, upper surface 422 is recessed from bearing surface 421 by the step depth, for example. Positive pressure developed along bar 420 increases the vertical and roll stiffness of slider 110 during operation.

With this arrangement, the elements of primary bearing feature 406 provide the majority of the lift and suction forces for defining the flying attitude of slider 110. A significant portion of the air flow within cavity 410 vents to side edges 402 and 404. The air bearing design serves to deflect pressurization of the trailing edge features formed on microactuator structure 130. In addition, microactuator structure 130 has a surface geometry that further minimizes pressurization of these features.

Microactuator structure 130 has an upper surface 430 which is recessed from bearing surface 137. Upper surface 430 is formed by the upper surfaces of insulator layers 140 and 142 and the upper surface of piezoelectric layer 148 (shown in FIG. 3). In one embodiment, upper surface 430 is recessed from bearing surface 137 by the cavity depth. Other depths can be used in alternative embodiments. First and second sets of discrete pads 432 and 434 are formed on upper surface 430 in opposing trailing corners of disc-facing surface 134. Air flow barrier walls 436 and 438 are also formed on upper surface 430, between pads 432, 434 and bar 420. In one embodiment, pads 432 and 434 and airflow barrier walls 436 and 438 are formed on the upper surface of the outer-most insulator layer 142 (shown in FIG. 3). For example, these features along with the primary bearing features 406 can be formed through photolithography processes such ion milling, chemical etching or reactive ion etching. With these processes, the depths and locations of the features can be accurately controlled.

The read/write head 137 (also shown in FIG. 3) is fabricated on one or more of the pads 432 and 434. At this location, head 137 is located at or near the closest point on slider 110 to the surface of the disc when the slider flies at a steady state relative to the disc surface, with a positive pitch angle.

In the embodiment shown in FIG. 4, airflow barrier wall 436 encloses the first set of pads 432 along three sides of the pads. Similarly, air flow barrier wall 438 encloses the second set of pads 434 along three sides of the pads. Walls 436 and 438 each have a leading section 440 and a pair of leg sections 442 and 444 extending rearward from the leading section 440. Leading sections 440 extend along the leading sides of pads 432 and 434, and leg sections 442 and 444 extend along the sides of pads 432 and 434. Air flow barrier walls 436 and 438 serve to divert or deflect air flow venting from the primary bearing feature 406 away from pads 432 and 434. This reduces pressurization of pads 432 and 434 and also serves to enhance the generation of subambient pressure in and around pads 432 and 434 in certain embodiments. In order to minimize pressurization of airflow barrier walls 436 and 438, the upper surfaces of walls 436 and 438 are recessed from bearing surface 421 by the step depth, for example. Other depths can be used, and the upper surfaces of walls 436 and 438 can be coplanar with bearing surface 421 in alternative embodiments. In other embodiments, the air flow barrier walls have curved profiles to improve performance. For example, the barrier walls can be "C-shaped" as viewed normally to the bearing surface.

In addition, airflow barrier walls can be formed with only leading section 440 and no leg sections 442 and 442. However in many embodiments, it is desirable for walls 436 and 438 to enclose pads 432 and 434 on at least two sides. In one embodiment discussed in more detail below, the airflow barrier walls completely enclose both sets of pads.

Figure 5:
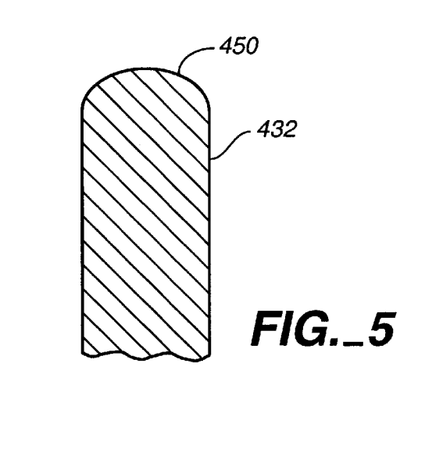
FIG. 5 is a cross-sectional view of one of a trailing edge pad on the slider taken along a line extending in a direction from a leading slider edge to a trailing slider edge.

The generation of positive pressure on the features formed on microactuator structure 130 is further reduced by dividing the regions of pads 432 and 434 into a plurality of discrete towers and by rounding the upper surfaces of the pads. FIG. 5 is a cross-sectional view of one of the pads 432 taken along a line extending in a direction from leading slider edge 400 to trailing slider edge 138. Pad 432 has an upper surface 450 which is generally convex along the cross section. This further reduces generation of positive pressure along upper surface 450.

As discussed above, the head-disc spacing can be adjusted by adjusting the electric field applied to piezoelectric layer 148 (shown in FIG. 3) within microactuator structure 130. In operation, air flow between slider 110 and the disc surface is restricted by the dominant air bearing surfaces of primary bearing feature 406, forward of pads 432 and 434. This results in a pressure drop immediately following bar 420. Air flow barrier walls 436 and 438 provide a second barrier to pressurization and deflect air flow around the pads when in close proximity to the disc surface. Pads 432 and 434 have discrete upper surfaces in order to provide paths for air to flow to the low-pressure regions formed behind barrier walls 436 and 438 and between the pads. By reducing the positive pressure developed along microactuator structure 130, actuation of microactuator structure 130 is effectively de-coupled from overall flying characteristics of slider 110, allowing the pad distance from the disc to be adjusted.

Figure 6:
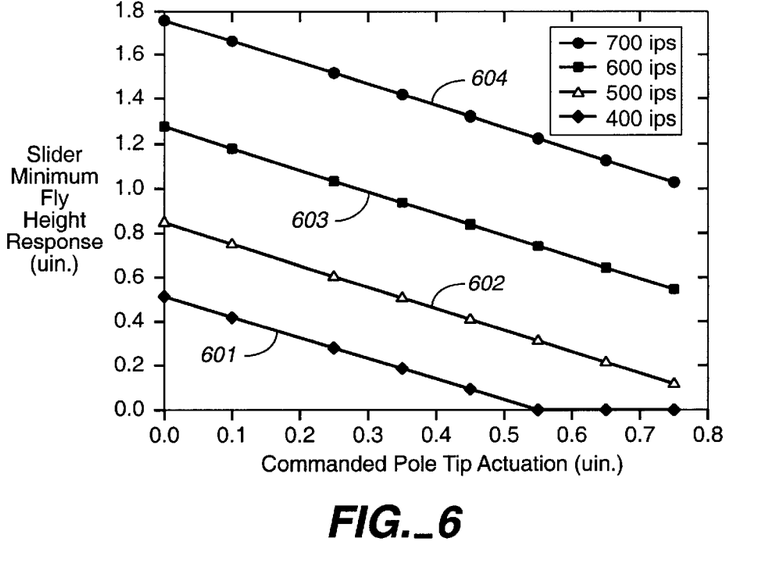
FIG. 6 is graph illustrating the simulated slider minimum fly height response of the slider shown in FIGS. 2–4 as a function of the commanded pole tip actuation in microinches.

The performance of slider 110 was simulated using a fluid dynamic finite volume analysis computer program known as "CML", which was developed by the Department of Mechanical Engineering at the University of California Berkley. FIG. 6 is graph illustrating the simulated slider minimum fly height response (in microinches) as a function of the commanded pole tip actuation in microinches. Lines 601–604 represent the minimum fly height responses at linear disc speeds of 400 inches per second (ips), 500 ips, 600 ips and 700 ips, respectively. The minimum fly height was measured at the trailing edge features formed by pads 432 and 434. As seen from lines 601–604, the head clearance varies linearly with a commanded pole tip actuation.

Figure 7:
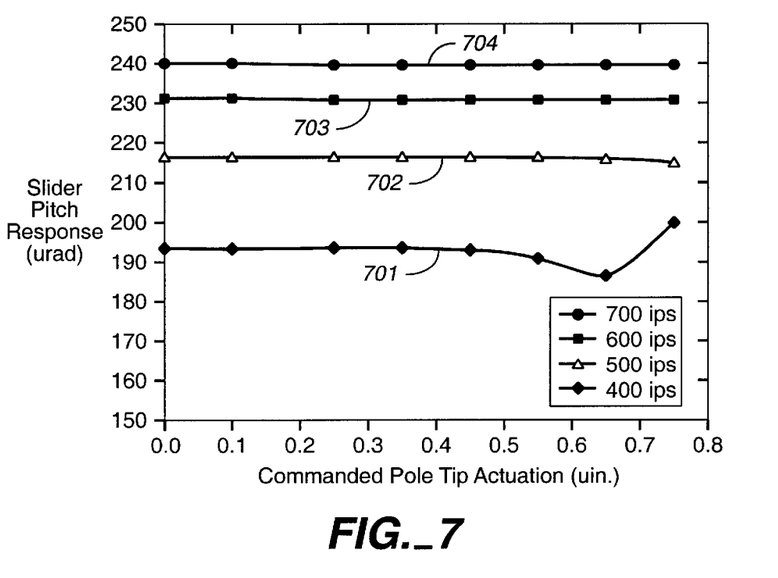
FIG. 7 is a graph illustrating the simulated slider pitch response in microradians of the slider shown in FIGS. 2–4 as a function of the commanded pole tip actuation in microinches.

FIG. 7 is a graph illustrating the simulated slider pitch response in microradians as a function of the commanded pole tip actuation in microinches. Lines 701–704 represent the pitch responses at disc speeds of 400 ips, 500 ips, 600 ips and 700 ips, respectively. As seen by lines 701–704, the pitch responses are largely unaffected by pole tip actuation, except for the largest actuation at the lowest disc speed.

Figure 8:
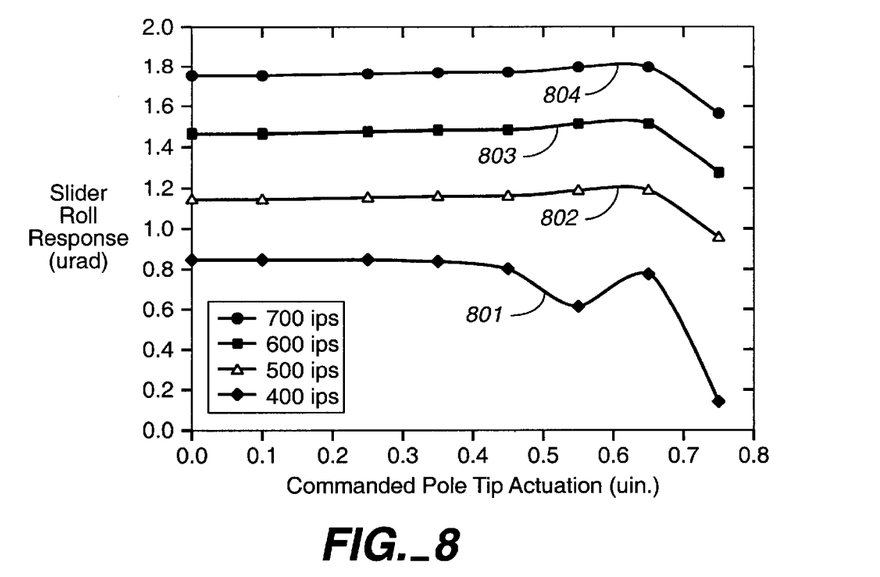
FIG. 8 is a graph illustrating the simulated slider roll response in microradians of the slider shown in FIGS. 2–4 as a function of the commanded pole tip actuation in microinches.

FIG. 8 is a graph illustrating the simulated slider roll response in microradians as a function of the commanded pole tip actuation in microinches. Again, line 801–804 represent the roll responses at disc speeds of 400 ips, 500, ips, 600 ips and 700 ips, respectively. The roll responses were also largely unaffected by pole tip actuation.

The graphs shown in FIGS. 6–8 therefore suggest that actuation of the slider trailing edge is substantially de-coupled from the overall flying characteristics of the slider.

Figure 9:
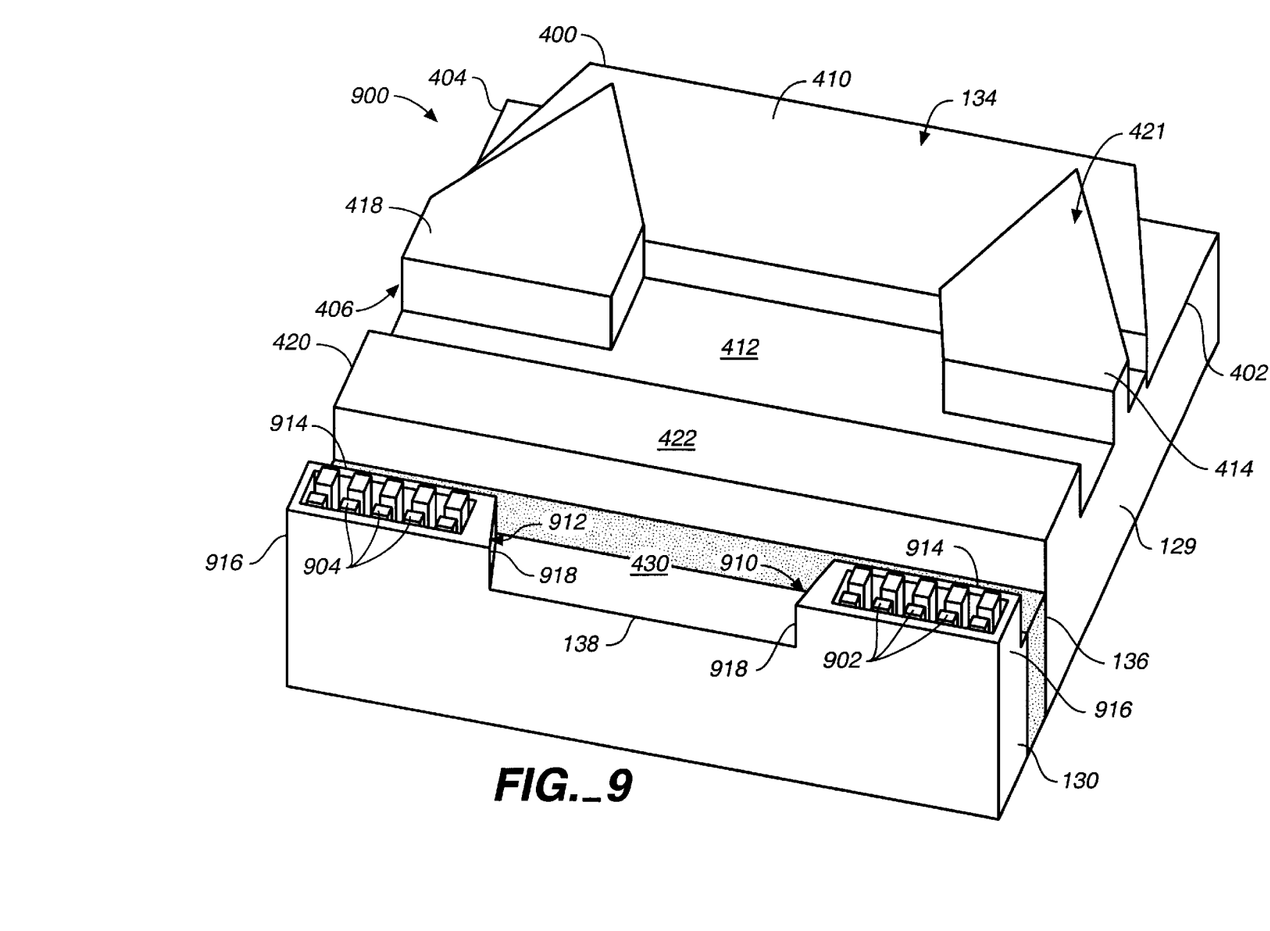
FIG. 9 is a bottom perspective view of a slider according to an alternative embodiment of the present invention.

FIG. 9 is a bottom perspective view of a slider 900 according to an alternative embodiment of the present invention. The same reference numerals are used in FIG. 9 as were used in FIG. 4 for the same or similar elements. Slider 900 further minimizes pressurization along the trailing slider edge through a modification of the slider shown in FIG. 4. As in FIG. 4, the upper surface 430 of microactuator structure 130 is recessed from bearing surface 137. A first plurality of pads 902 and 904 are formed as discrete towers on upper surface 430, similar to pads 432 and 434 in FIG. 4. Air flow barrier walls 910 and 912 extend upward from the upper surface 430 and completely enclose pads 902 and 904. Barrier walls 910 and 912 each has a leading section 914, leg sections 916 and 918 and a trailing section 920. Leading section 914 has a curved leading wall surface which is oriented to further divert air flow away from pads 902 and 904. Trailing section 920 serves as a trailing edge dike which increase the size of the low pressure zones around pads 902 and 904. This further offsets the lift effects on the upper surfaces of the pads. In one embodiment, the upper surfaces of barrier walls 910 and 912 are recessed slightly from the upper surfaces of pads 902 and 904. In other embodiments, pads 902 and 904 and walls 910 and 912 can be formed on a surface which is raised or recessed relative to upper surface 430.

Figure 10:
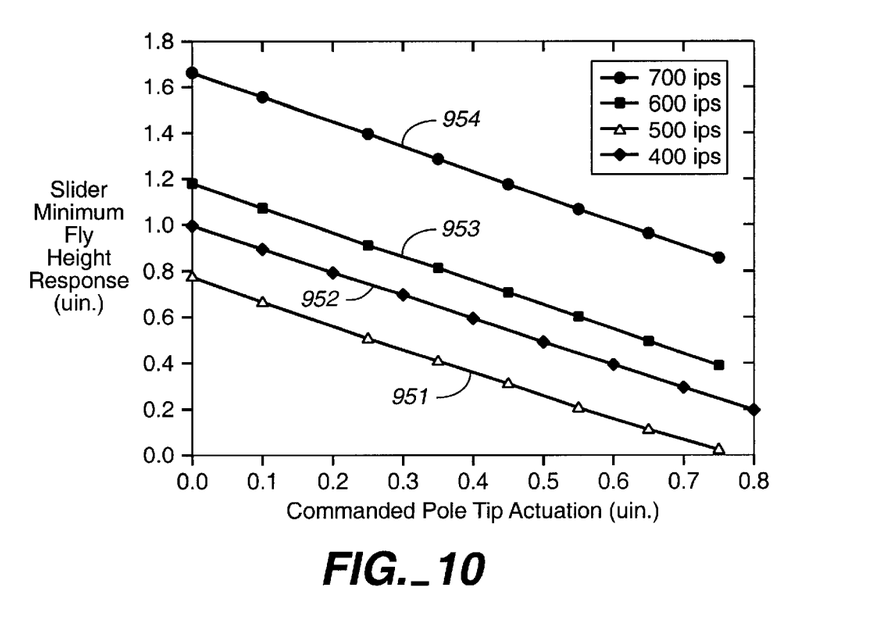
FIG. 10 is a graph illustrating the simulated slider minimum fly height response in microinches of the slider shown in FIG. 9 as a function of the commanded pole tip actuation in microinches.

FIG. 10 is a graph illustrating the simulated slider minimum fly height response in microinches for slider 900 as a function of the commanded pole tip actuation in microinches. Lines 951–954 represent the minimum fly height response at disc speeds of 400 ips, 500, ips, 600 ips and 700 ips, respectively. The addition of the trailing edge wall sections extends the linear range of the fly height actuation slightly at the low ends of the minimum curves as compared to that shown in FIG. 6.

Figure 11:
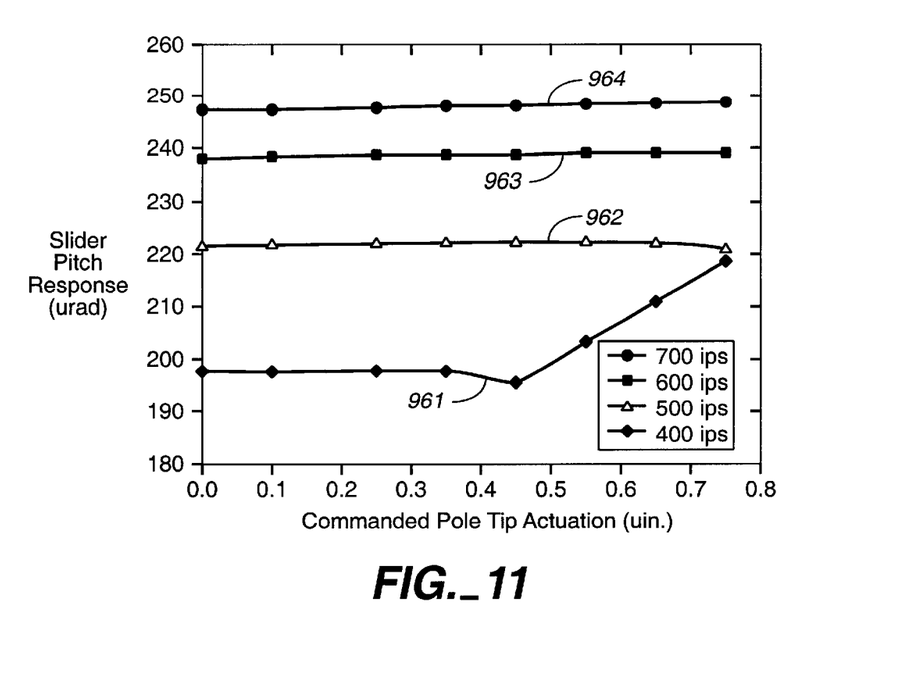
FIG. 11 is a graph illustrating the simulated pitch response in microradians of the slider shown in FIG. 9 as a function of the commanded pole tip actuation in microinches.

FIG. 11 is a graph illustrating simulated pitch response in microradians for slider 900 as a function of the commanded pole tip actuation in microinches. Lines 961–964 represent the pitch responses at disc speeds of 400 ips, 500 ips, 600 ips and 700 ips, respectively. The addition of the trailing edge wall sections appear to reduce pitch response when the trailing edge is actuated down.

Figure 12:
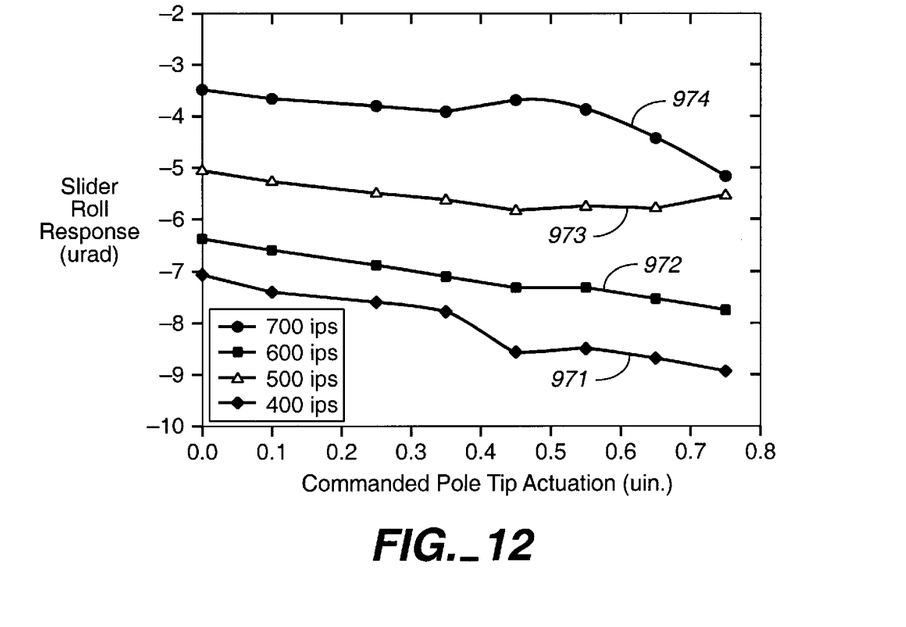
FIG. 12 is a graph illustrating the simulated slider roll response in microradians of the slider shown in FIG. 9 as a function of the commanded pole tip actuation in microinches.

FIG. 12 is a graph illustrating the simulated slider roll response in microradians for slider 900 as a function of the commanded pole tip actuation in microinches. Again, lines 971–974 represent the roll responses at disc speeds of 400 ips, 500 ips, 600 ips and 700 ips, respectively. The addition of the trailing edge wall sections appears to make the roll response less consistent as compared to that shown in FIG. 8. Specific non-symmetric air bearing designs can compensate for this problem.

Figure 13:
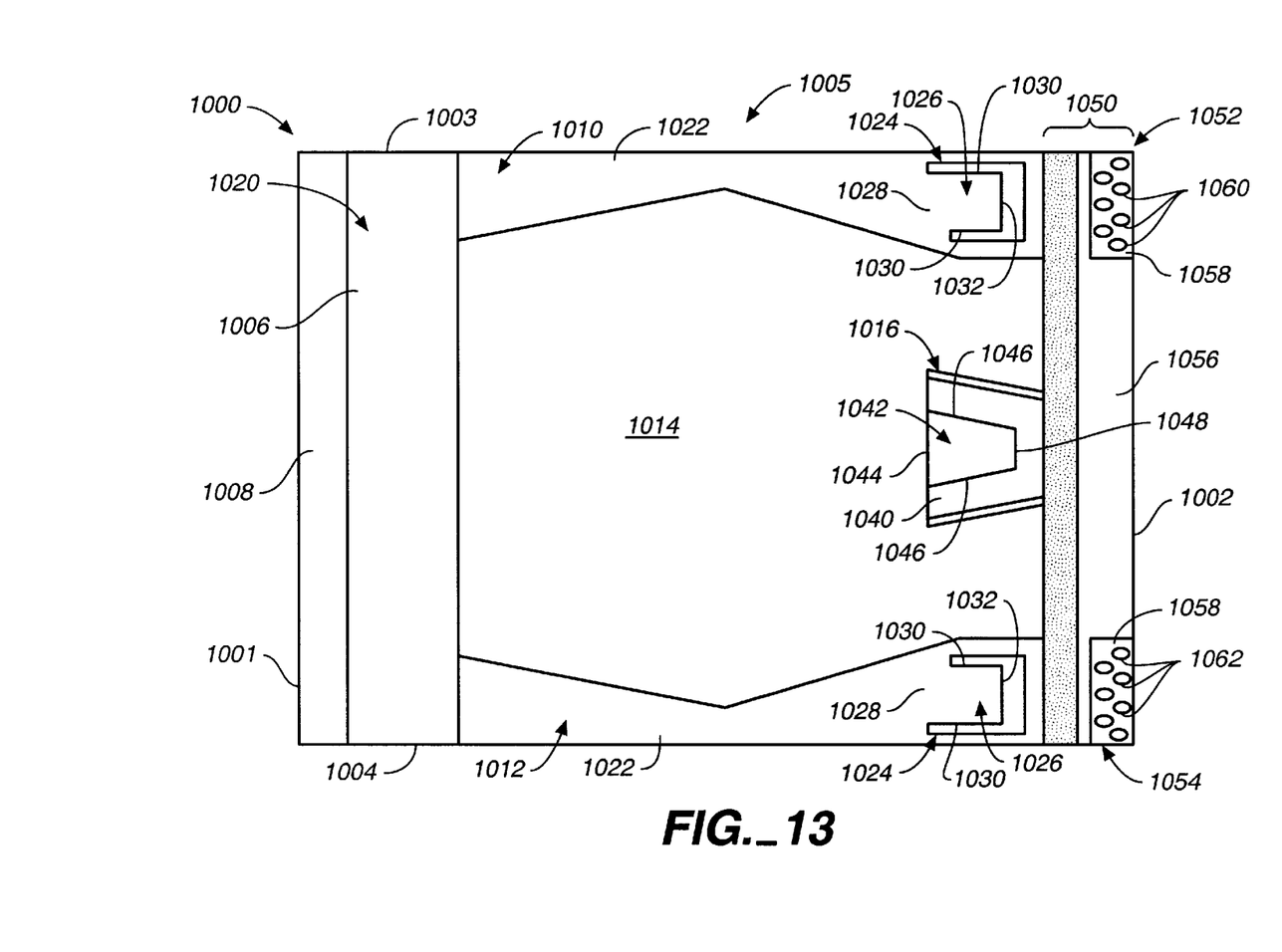
FIG. 13 is a top plan view of a slider according to another alternative embodiment of the present invention.

FIG. 13 is a top plan view of a slider 1000 according to another alternative embodiment of the present invention. Slider 1000 has a leading edge 1001, a trailing edge 1002 and side edges 1003 and 1004. Slider 1000 has a primary bearing feature 1005 formed by cavity dam 1006, leading step surface 1008, side rails 1010 and 1012, subambient pressure cavity 1014 and center pad 1016. The upper surface of cavity dam 1006 forms a portion of an overall bearing surface 1020. Leading step 1008 is recessed from cavity dam 1006 by the step depth, for example. Subambient pressure cavity 1014 is recessed from bearing surface 1020 by the cavity depth, for example. Side rails 1010 and 1012 extend rearward from cavity dam 1006, along side edges 1003 and 1004, respectively. Side rails 1010 and 1012 each have an upper, recessed step surface 1022 which extends from cavity dam 1006 to a trailing edge of the rail. Recessed step surfaces 1022 are recessed from bearing surface 1020 by the step depth, for example. Rails 1010 and 1012 each further include a trailing bearing pad 1024 which has a generally u-shape. Bearing pad 1024 has an upper surface which is generally coplanar with and forms part of the overall bearing surface 1020. A convergent channel 1026 is recessed within each of the pads 1024, which has a leading channel end 1028, channel side walls 1030 and a trailing channel end 1032. Leading channel end 1028 is open to fluid flow from recessed step surface 1022 of the respective rail, and trailing channel end 1032 is closed to the fluid flow. Air flow entering convergent channel 1026 is bounded by channel side walls 1030 and is forced over trailing channel end 1032, thereby generating a large pressure gradient between bearing pad 1024 and the disc surface. These large pressure gradients increase the vertical and roll stiffnesses of slider 1000.

Similarly, center rail 1016 has an upper surface 1040 which is coplanar with and forms part of the overall bearing surface 1020. A convergent channel 1042 is recessed within center rail 1016 and has a leading channel end 1044, channel side walls 1046 and a trailing channel 1048. The floor of convergent channel 1042 is recessed from bearing surface 1020 by the step depth, for example. Leading channel end 1044 is open to fluid flow from subambient pressure cavity 1014. Fluid flow entering channel 1042 is bounded by channel side walls 1046 and is forced over trailing channel end 1048, thereby creating an additional positive pressure gradient between slider 1000 and the disc surface. This further increases the vertical and pitch stiffnesses of slider 1000. Convergent channels 1026 and 1042 also improve suction forces in the areas immediately trailing the channels.

Similar to sliders 110 and 900, slider 1000 has a microactuator structure 1050 attached to the trailing surface of the slider body. Microactuator structure 1050 has a similar structure as that shown in FIG. 3 in one embodiment of the present invention. A pair of surfaces (or platforms) 1052 and 1054 are fabricated on the upper surface 1056 of microactuator structure 1050 along trailing slider edge 1002. Platforms 1052 and 1054 are positioned in opposing trailing corners of slider 1000. Platforms 1052 and 1054 have upper surfaces 1058 that are raised from upper surface 1056 and are recessed from bearing surface 1020. In one embodiment, platforms 1052 are recessed from step surfaces 1022. First and second sets of pads 1060 and 1062 are formed on upper surfaces 1058 of platforms 1052 and 1054, respectively. The upper surfaces of pads 1060 and 1062 can be at the same or different heights than bearing surface 1020 when microactuator structure 1050 is at a nominal, zero actuation state. In alternative embodiments, the upper surfaces of platforms 1052 and 1054 are coplanar with the floor of cavity 1014 or recessed relative to cavity 1014.

In one embodiment, slider 1000 is configured as a glide head for detecting or otherwise sensing contact between slider 1000 and the disc surface. One or more contact sensors are attached to pads 1060 and 1062 (or at any other location on the slider) for detecting contact. A variety of different types of sensors can be used such as capacitive, piezoelectric and magnetoresistive devices. The shear PZT can also act as a sensor. Signals generated from the glide head sensors can be used to map asperities and/or other defects in the disc surface, for example. In an alternative embodiment, slider 1000 is configured as a read/write head, with the read/write transducer being fabricated on one or more of the pads 1060 and 1062.

Figure 14:
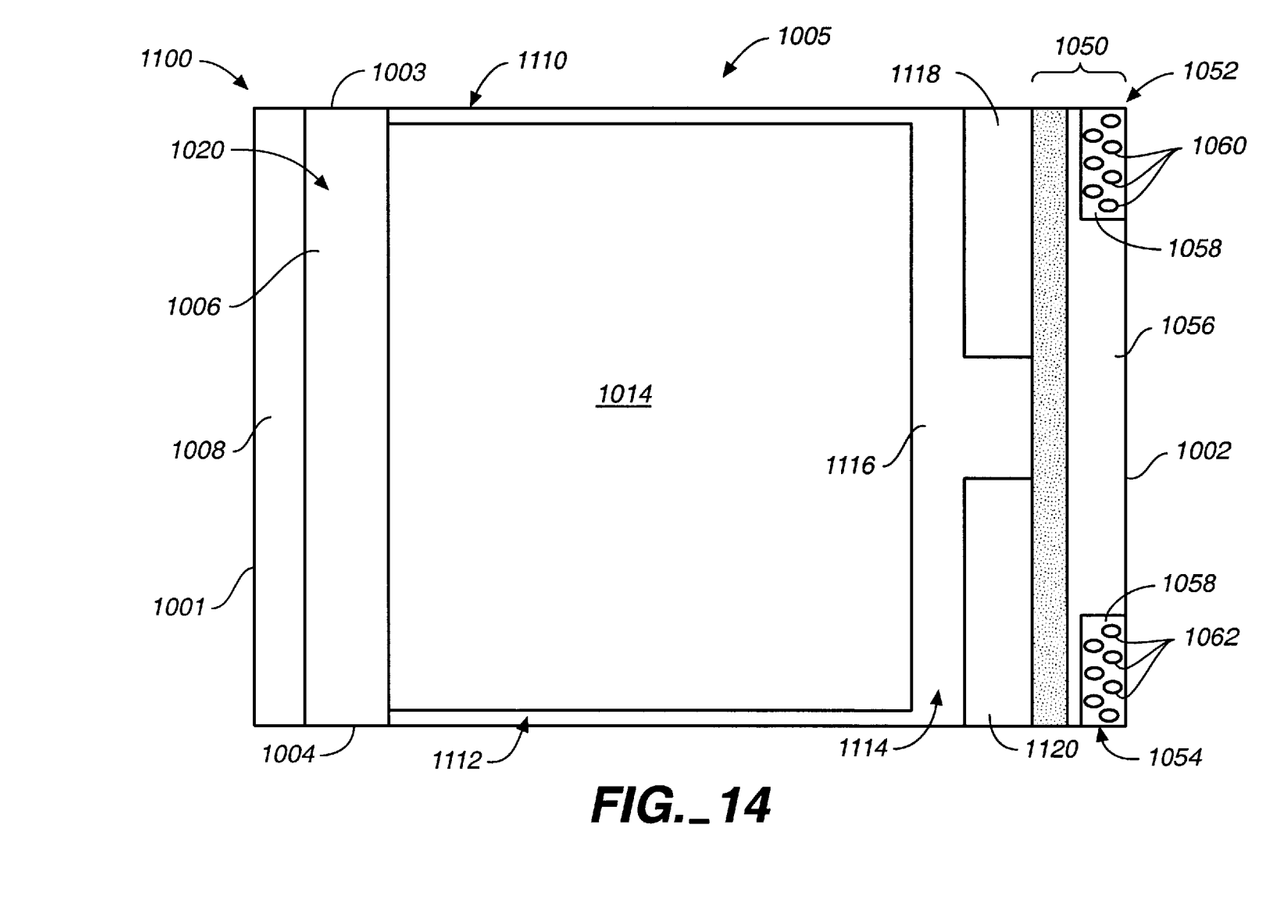
FIG. 14 is a top plan view of a slider according to another alternative embodiment of the present invention.

FIG. 14 is a top plan view of a slider 1100 according to another alternative embodiment of the present invention. The same reference numerals are used in FIG. 14 are were used in FIG. 13 for the same or similar elements. In slider 1100, side rails 1110 and 1112 are formed very thin to maximize the size of subambient pressure cavity 1014 while still containing the subambient pressure. The upper surfaces of rails 1110 and 1112 are recessed from bearing surface 1020 by the step depth, for example. Rails 1110 and 1112 join with a laterally extending bar 1114, which extends from side edge 1003 to side edge 1004. Bar 1114 has a leading recessed step surface 1116 extending along the entire leading edge of the bar, and a pair of large bearing surfaces 1118 and 1120, which are coplanar with bearing surface 1020. The long step area 116 enhances air bearing stiffness. Bearing surfaces 1118 and 1120 generate positive pressure near the trailing edge while serving as airflow barrier walls for reducing pressure around pads 1060 and 1062 on microactuator structure 1050. Additional barrier walls, such as those shown in FIGS. 3 and 9, can also be used to at least partially surround pads 1060 and 1062.

With the above described embodiments, the portion of the slider nearest the recording media (i.e. the trailing edge) can be actuated in a linear fashion while allowing the rest of the slider to remain at a static distance and attitude relative to the disc. This minimizes the impact of variable pole tip spacing on the overall slider flying characteristics. The comparatively small trailing edge mass minimizes the inertial response of the main slider body in response to dynamic actuation of the trailing edge.

Various other modifications can also be made in alternative embodiments. For example, the slider can have a single pad for supporting a read/write transducer or contact sensor, with an airflow barrier wall at least partially shielding the pad from airflow. The pad or pads can be positioned in the trailing corners of the slider or anywhere along the trailing edge such as along the slider's longitudinal center line.

In summary, one embodiment of the present invention is directed to a disc head slider 110, 900, 1000, 1100 having a disc-facing surface 134 with a leading slider edge 400, 1001 and a trailing slider edge 138, 1002. A primary bearing feature 406, 1005 is formed on the disc-facing surface 134 forward of the trailing slider edge 138, 1002 and has a bearing surface 421, 1020. A plurality of pads 432, 434, 902, 904, 1060, 1062 is formed on the disc-facing surface between the primary bearing feature 406, 1005 and the trailing slider edge 138, 1002. Each of the pads 432, 434, 902, 904, 1060, 1062 has an upper surface that is discrete from the upper surfaces of the other pads. An airflow barrier wall 436, 438, 910, 912 is positioned adjacent the plurality of pads 432, 434, 902, 904, 1060, 1062 to at least partially shield the plurality of pads from airflow from the primary bearing feature 406, 1020.

Another embodiment of the present invention is directed to a disc head slider 110, 900, 1000, 1100 having a slider body 129 with a disc-facing surface 134 and a trailing surface 136. A primary bearing feature 406, 1005 is formed on the disc-facing surface and has a bearing surface 421, 1020. A piezoelectric microactuator 130, 1050 is formed on the trailing surface 134 of the slider body 129, which is changeable in shape in a direction 139 normal to the disc-facing surface in response to an applied voltage. The microactuator 130, 1050 has an upper surface 430, 1056 which is recessed from the bearing surface 421, 1020. At least one raised pad 432, 434, 902, 904, 1060, 1062 is formed on the upper surface 430, 1056 of the microactuator 130, 1050. Further features are provided for limiting pressurization of the at least one pad 432, 434, 902, 904, 1060, 1062 due to airflow from the primary bearing feature 406, 1005.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the disc drive system while maintaining substantially the same functionality without departing from the scope and spirit of the present invention. In addition, although the preferred embodiment described herein is directed to a self-loading type sliders, it will be appreciated by those skilled in the art that the teachings of the present invention can be applied to positive-pressure type air bearing sliders (PPABs) without departing from the scope and spirit of the present invention. Also, each embodiment can be configured as a read/write slider having a read/write head or as a glide head slider having one or more contact-sensing transducers for example.

What is claimed is:

1. A disc head slider comprising:
   a disc facing surface with a leading slider edge and a trailing slider edge;
   a primary bearing feature formed on the disc facing surface forward of the trailing slider edge and having a bearing surface;
   a first plurality of pads formed on the disc facing surface between the primary bearing feature and the trailing slider edge, wherein each of the pads has an upper surface that is discrete from the upper surfaces of the other pads; and
   an airflow barrier wall positioned adjacent the first plurality of pads to at least partially shield the first plurality of pads from airflow from the primary bearing feature.

2. The disc head slider of claim 1 and further comprising:
   a recessed area positioned between the primary bearing feature and the airflow barrier wall and between the airflow barrier wall and the first plurality of pads, which is recessed from the bearing surface and the upper surfaces of the first plurality of pads, wherein each of the first plurality of pads comprises a discrete tower formed on the recessed area.

3. The disc head slider of claim 1 and further comprising:
   a recessed area positioned between the primary bearing feature and the first plurality of pads, which is recessed from the bearing surface and the upper surfaces of the first plurality of pads; and
   a platform which is formed within the recessed area and has an upper surface which is raised from the recessed area and recessed from the bearing surface, wherein the first plurality of pads and the airflow barrier wall are formed on the upper surface of the platform.

4. The disc head slider of claim 1 and further comprising:
   a recessed area positioned between the primary bearing feature and the airflow barrier wall, which is recessed from the bearing surface and the upper surfaces of the first plurality of pads, and wherein the airflow barrier wall has an upper surface which is raised from the recessed area and recessed from the bearing surface and the upper surfaces of the first plurality of pads.

5. The disc head slider of claim 1 wherein the upper surface of each of the first plurality of pads is convex along a cross section of the upper surface taken along a line extending in a direction from the leading slider edge toward the trailing slider edge.

6. The disc head slider of claim 1 wherein the airflow barrier wall encloses the first plurality of pads along at least two sides of the first plurality of pads.

7. The disc head slider of claim 6 wherein the airflow barrier wall has a curved leading wall surface oriented to divert airflow away from the first plurality of pads.

8. The disc head slider of claim 1 and further comprising:
   a second plurality of pads formed on the disc facing surface between the primary bearing feature and the trailing slider edge, wherein each of the second plurality of pads has an upper surface that is discrete from the upper surfaces of the other of the second plurality of pads, wherein the first; and
   a further airflow barrier wall adjacent the second plurality of pads, between the pads and the primary bearing feature, wherein the second plurality of pads and the further airflow barrier wall are disposed laterally along the trailing slider edge in a group relative to a group formed by the first plurality of pads and the first mentioned airflow barrier wall.

9. The disc head slider of claim 1 and further comprising a transducer positioned on one of the first plurality of pads along the trailing slider edge.

10. The disc head slider of claim 1 and further comprising:
    a main slider body on which the primary bearing features are formed, wherein the main slider body comprises a leading surface and an opposing trailing surface; and
    a piezoelectric microactuator formed on the trailing surface of the main slider body and having an upper surface which is recessed from the bearing surface and has a trailing edge that defines the trailing slider edge, wherein the first plurality of pads and the airflow barrier wall are formed on the upper surface of the piezoelectric microactuator.

11. The disc head slider of claim 1 wherein the primary bearing feature comprises:
    a cavity dam;
    a subambient pressure cavity which trails the cavity dam;
    first and second raised side rails extending rearward from the cavity dam on opposing sides of the subambient pressure cavity and having upper surfaces that form portions of the bearing surface; and
    a raised bar which is spaced rearward of the first and second raised rails and forward of the airflow barrier wall and which extends laterally in a direction parallel to the trailing slider edge, from a first side edge of the slider to a second opposing side edge of the slider.

12. The disc head slider of claim 1 wherein the primary bearing feature comprises:
    a cavity dam;
    a subambient pressure cavity which trails the cavity dam and has a cavity floor which is recessed from the bearing surface;
    first and second raised side rails extending rearward from the cavity dam on opposing sides of the subambient pressure cavity, wherein each of the raised rails comprises a trailing rail edge that terminates prior to the first plurality of pads and a recessed step surface which extends from the cavity dam to the trailing rail edge, is recessed from the bearing surface and is raised from the cavity floor; and first and second raised bearing pads formed on the recessed step surfaces of the first and second raised rails, respectively, generally along the respective trailing rail edge, wherein each raised bearing pad has an upper surface forming part of the bearing surface and a convergent channel recessed into the upper surface, wherein the convergent channel comprises a leading channel end that is open to fluid flow from the respective recessed step surface, channel side walls and a trailing channel end that is closed to the fluid flow and forward of a portion of the upper surface of the bearing pad.

13. The disc head slider of claim 12 wherein the primary bearing feature further comprises:

a lateral center line; and a raised center rail formed along the lateral center line rearward of the subambient pressure cavity; and a convergent channel which is recessed into the raised center rail and comprises a leading channel end that is open to fluid flow from the subambient pressure cavity, channel side walls and a trailing channel end that is closed to the fluid flow from the subambient pressure cavity.

14. A disc head slider comprising:

a slider body comprising a disc facing surface and a trailing surface;

a primary bearing feature formed on the disc facing surface and having a bearing surface;

a piezoelectric microactuator formed on the trailing surface of the slider body which is changeable in shape in a direction normal to the disc facing surface in response to an applied voltage and which has an upper surface which is recessed from the bearing surface;

at least one raised pad formed on the upper surface of the piezoelectric microactuator; and means for limiting pressurization of the at least one pad due to airflow from the primary bearing feature.

15. The disc head slider of claim 14 and further comprising:

a first plurality of pads, including the at least one raised pad, formed on the upper surface of the microactuator between the primary bearing feature and a trailing edge of the microactuator, wherein each of the pads has an upper surface that is discrete from the upper surfaces of the other pads; and wherein the means for limiting pressurization comprises an airflow barrier wall formed on the upper surface of the microactuator, between the first plurality of pads and the primary bearing feature to at least partially shield the first plurality of pads from airflow from the primary bearing feature.

16. The disc head slider of claim 15 wherein each of the first plurality of pads comprises a discrete tower formed on the upper surface of the microactuator.

17. The disc head slider of claim 15 and further comprising:

a platform which is formed on the upper surface of the microactuator and has an upper platform surface which is raised from the upper surface of the microacuator and recessed from the bearing surface, wherein the first plurality of pads are formed on the upper platform surface.

18. The disc head slider of claim 15 wherein the airflow barrier wall has an upper surface which is recessed from the bearing surface and the upper surfaces of the first plurality of pads.

19. The disc head slider of claim 15 wherein the slide has a leading and trailing slider edges and the upper surface of each of the first plurality of pads is convex along a cross section of the upper surface taken along a line extending in a direction from the leading slider edge toward the trailing slider edge.

20. The disc head slider of claim 15 wherein the airflow barrier wall encloses the first plurality of pads along at least two sides of the first plurality of pads.

21. The disc head slider of claim 20 wherein the airflow barrier wall has a curved leading wall surface oriented to divert airflow away from the first plurality of pads.

22. The disc head slider of claim 15 and further comprising:

a second plurality of pads formed on the upper surface of the microactuator between the primary bearing feature and the trailing edge of the microactuator, wherein each of the second plurality of pads has an upper surface that is discrete from the upper surfaces of the other pads; and wherein the means for limiting pressurization further comprises a further airflow barrier wall formed on the upper surface of the microactuator, between the second plurality of pads and the primary bearing feature to at least partially shield the second plurality of pads from airflow from the primary bearing feature, wherein the second plurality of pads and the further airflow barrier wall are disposed laterally along the trailing slider edge in a group relative to a group formed by the first plurality of pads and the first mentioned airflow barrier wall.

23. The disc head slider of claim 15 and further comprising a transducer positioned on one of the first plurality of pads along the trailing slider edge.

24. The disc head slider of claim 14 wherein the primary bearing feature comprises:

a cavity dam;

a subambient pressure cavity which trails the cavity dam;

first and second raised side rails extending rearward from the cavity dam on opposing sides of the subambient pressure cavity and having upper surfaces that form portions of the bearing surface; and a raised bar which is spaced rearward of the first and second raised rails and forward of the microactuator and which extends laterally in a direction parallel to a trailing edge of the slider, from a first side edge of the slider to a second opposing side edge of the slider.

25. The disc head slider of claim 14 wherein the primary bearing feature comprises:

a cavity dam;

a subambient pressure cavity which trails the cavity dam and has a cavity floor which is recessed from the bearing surface;

first and second raised side rails extending rearward from the cavity dam on opposing sides of the subambient pressure cavity, wherein each of the raised rails comprises a trailing rail edge that terminates prior to the microactuator and a recessed step surface which is recessed from the bearing surface and is raised from the cavity floor; and first and second raised bearing pads formed on the recessed step surfaces of the first and second raised rails, respectively, generally along the respective trailing rail edge, wherein each raised bearing pad has an upper surface forming part of the bearing surface and a convergent channel recessed into the upper surface, wherein the convergent channel comprises a leading channel end that is open to fluid flow from the respective recessed step surface, channel side walls and a trailing channel end that is closed to the fluid flow and forward of a portion of the upper surface of the bearing pad.

26. The disc head slider of claim 25 wherein the primary bearing feature further comprises:

a lateral center line; and a raised center rail formed along the lateral center line rearward of the subambient pressure cavity; and a convergent channel which is recessed into the raised center rail and comprises a leading channel end that is open to fluid flow from the subambient pressure cavity, channel side walls and a trailing channel end that is closed to the fluid flow from the subambient pressure cavity.

* * * * *